Aug. 20, 1957 J. R. NEWELL 2,803,323
POSITIVE ENGAGE POSITIVE STOP CLUTCH
Filed Dec. 13, 1954
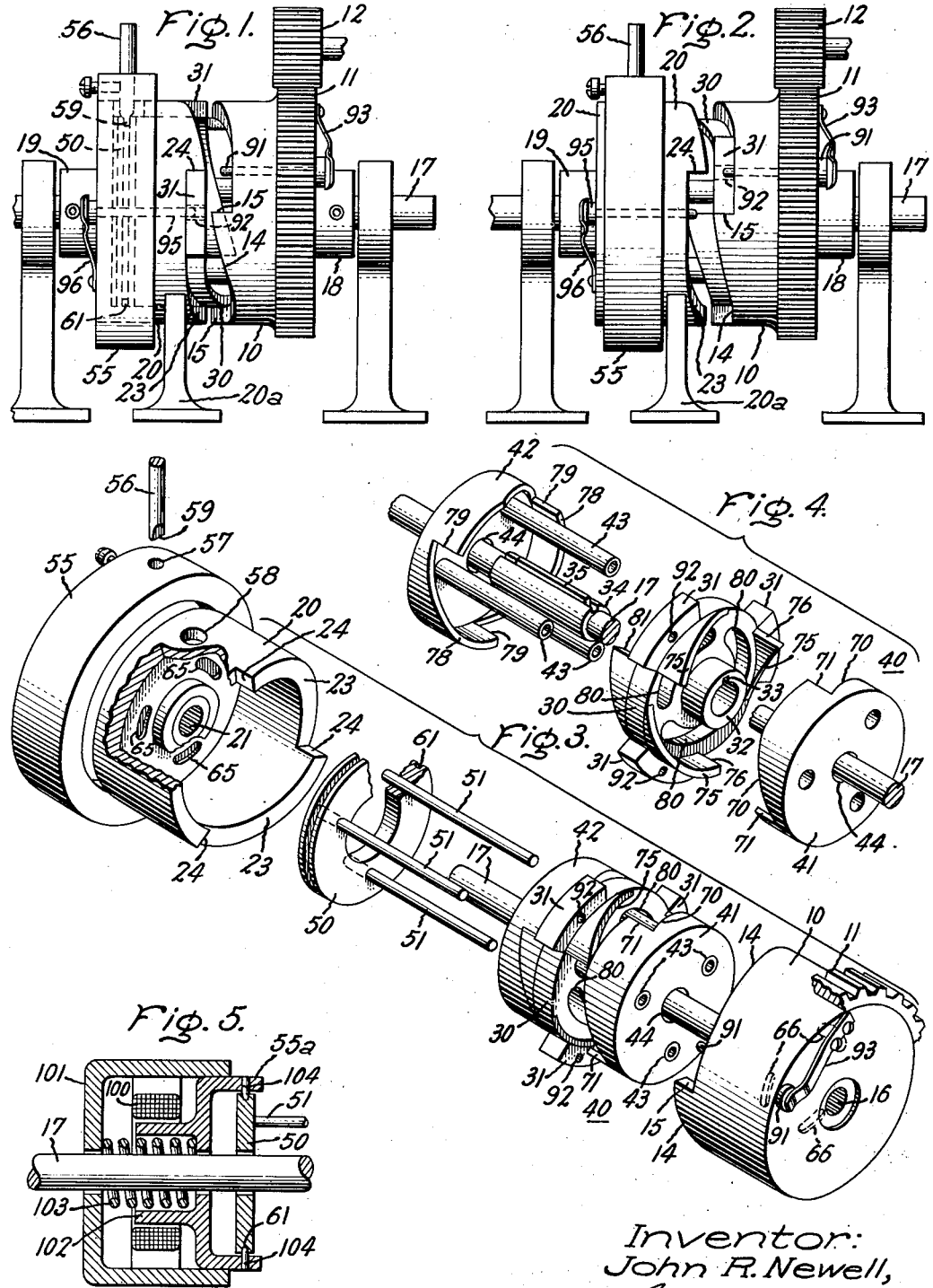
Inventor:
John R. Newell,
by Claude A. Mott
His Attorney.

United States Patent Office 2,803,323
Patented Aug. 20, 1957

2,803,323

POSITIVE ENGAGE POSITIVE STOP CLUTCH

John R. Newell, Schenectady, N. Y., assignor to General Electric Company, a corporation of New York Application December 13, 1954, Serial No. 474,771

6 Claims. (Cl. 192—18)

This invention relates to positive engage, positive stop clutches of the rotary type, and has for its object the provision of a simple and reliable clutch having positive engagement in the driving position and positive engagement in the stop position and which is capable of actuation during relative rotation between the clutch members.

Positive engage, positive stop clutches have been known in the past but insofar as is known, because of the positive nature of the engagement between the moving and stationary parts, such clutches have not been capable of actuation during relative rotation between the clutch members.

The clutch of this invention is especially useful in driving a device at high speed, but intermittently, the device being stopped in a predetermined angular position. The engagement and disengagement of such a device often must be accurately timed for proper operation. When the clutch is disengaged, it must stop in an exact position. Prior used clutches that are positive engage and have a positive stop position have the disadvantage of becoming jammed at approximately a half engage or half stop position when operating at the speeds required for operation of the device.

Briefly stated in accordance with one aspect of this invention, there is provided a clutch having a rotatable driving member, a stationary member, and a rotatable axially movable driven member adapted for alternative positive engagement with the driving member and the stationary member. The driving member and the stationary member have jaws extending axially toward each other but facing in opposite directions, and the driven member has a tooth for cooperation with these jaws. A rotatable control member is provided concentrically arranged with respect to the driven member, and coupling means selectively couple the control member to the driving member or to the stationary member. Means are provided responsive to operation of this coupling means, and associated with the control member, for causing axial movement of the driven member to bring its tooth into positive locking engagement with the jaw of the driving member or into positive locking engagement with the jaw of the stationary member.

The invention will be better understood and other objects and additional advantages of the invention will become apparent upon perusal of the following description taken in connection with the drawings, and the scope of the invention will be defined in the appended claims.

In the drawings, Fig. 1 is a front elevation of a clutch embodying the principles of this invention showing the clutch in the disengaged position or in the positive stop position.

Fig. 2 is a view like Fig. 1, but showing the engaged position of the clutch.

Fig. 3 is an exploded perspective view of the clutch shown in Figs. 1 and 2.

Fig. 4 is an exploded perspective view of the control member and the driven member of Fig. 3.

Fig. 5 is a fragmentary sectional view showing an alternative embodiment of one aspect of this invention.

Referring more particularly to the drawings, the preferred embodiment of this invention will now be described; however, this description will be understood to be illustrative of the invention and not as limiting it to the particular construction shown and described. A rotatable driving member is provided having an axially extending jaw thereon. As illustrated, this driving member is in the form of a cup-shaped member 10 having a gear 11 formed thereon and adapted to receive driving power from the meshing gear 12. The clutch face of the driving member 10 comprises a plurality of axially tapering portions 14, each terminating in an axially extending jaw 15. The driving member 10 includes bearings 16 adapting it for rotation about a driven shaft 17, and is held in fixed axial position along the shaft 17 by a collar 18 mounted on the shaft. Thus the output shaft 17 is intermittently driven by the driving member 10 engaged by the power gear 12.

A stationary member is provided having a jaw extending axially toward each jaw on the driving member and similar thereto but facing in the opposite direction. This stationary member as illustrated, comprises a cup-shaped member 20, mounted on a support member 20a, and having a bearing 21 therein adapting the driven shaft 17 for rotation within the stationary member 20 and a collar 19 secured on the shaft holds the shaft in fixed axial position. The clutch face of the stationary member 20 comprises tapered surfaces 23 terminating in jaws 24 which extend axially toward the jaws on the driving member. These jaws 24 are similar to the jaws 15 on the driving member, but are facing in the opposite direction.

A rotatable axially movable driven member is provided having at least one tooth adapted for alternative engagement with the jaws on the driving member and the stationary member. As illustrated, this driven member is a disk-like member 30 having teeth 31 extending radially outward therefrom, and including a hub 32 with a slot 33 therein adapting the driven member to be keyed to an enlarged portion 34 of the driven shaft 17 by a key 35.

A rotatable control member is provided and is concentric with the driven member. As illustrated, this control member is a structure 40 comprising a pair of cup-shaped members 41 and 42 spaced apart and rigidly secured together by connecting pins 43. This control member 40 has bores 44 in the cup-shaped members 41 and 42, respectively, adapting it to be rotatable about the driven shaft 17, with the driven member 30 positioned between the members 41 and 42.

Coupling means are provided for selectively coupling the control member to the driving member or to the stationary member. As illustrated, this coupling means comprises an actuator ring 50 carrying a plurality of pins 51 mounted at spaced intervals therein. An actuating cylinder 55 surrounds the stationary member 20 and carries an actuating lever 56 in a bore 57 therein, and the diameter of the actuating cylinder 55 is such that it is axially movable with respect to the stationary member 20. The actuating lever 56 extends through an enlarged hole 58 in the stationary member 20, and a tongue portion 59 on the end of the actuating lever engages an annular groove 61 formed in the outer surface of the actuating ring 50. Thus, it will be seen that axial movement of the actuating lever 56 as provided by the enlarged hole 58 causes axial movement of the actuating ring 50 and the pins 51 which are carried therein. A plurality of arcuate slots 65 are formed in the inner side of the end wall of the stationary member 20 and are spaced to receive the projecting ends of the pins 51 when the actuating ring 50 is moved to the left of the drawing (Fig. 3) to its farthest position. Similar slots 66 are formed in the inner side of the end wall of the cup-shaped driving member 10 and are disposed in corresponding relation to the slots 65 and also are spaced to receive the opposite ends of the pins 51 when the actuating ring 50 is moved as far as it will go to the right of the drawing as seen in Fig. 3. It will be observed that the pins 43 connecting the opposite parts of the control member 40 into a rigid structure are hollow and are adapted to receive the pins 51 through their hollow portions. Thus, it will be observed that when the actuating lever 56 is moved to the left as seen in Fig. 3, the control member 40 will be coupled with the stationary member 20 by engagement of the pins 51 with the walls of the slots 65, while movement of the actuating lever 56 to the right will couple the control member 40 to the driving member 10 by engagement of the pins 51 with the walls of the slots 66.

Means are provided responsive to the selective operation of the coupling means 50 and associated with the control member for causing axial movement of the driven member 30 to bring its teeth into positive locking engagement with the jaws of the driving member 10 or into positive locking engagement with the jaw of the stationary member 20. This means includes cooperating cam surfaces on the inner faces of the cup-shaped members 41 and 42 and on the outer faces of the driven member 30 positioned between the members 41 and 42. Thus, the face of the cup-shaped member 41 comprises a series of axially tapering portions 70 terminating in axially extending jaws 71. The face of the driven member 30 closest to the cup-shaped member 41 has tapered portions 75 thereon which terminate in axially extending jaws 76. The tapered portions on the cup-shaped member 41 and the driven member 30 are mating surfaces disposed in such manner that they cooperate with each other. In a similar fashion, the cup-shaped member 42 of the control member 40 has tapered portions 78 which mate with similar but oppositely disposed tapered portions on the opposite side of the driven member from the tapered portions 75 described above. Means are provided for permitting limited angular movement of the driven member with respect to the control member and as illustrated, this means comprises arcuate slots 80 formed in the driven member 30 and having a length several times the diameter of the connecting pins 43. It will be observed that the jaws 76 on one side of the driven member are in line with the jaws 81 on the opposite side of the driven member, and that the jaws 71 on the cup-shaped member 41 are spaced in between the jaws 79 on the opposite cup-shaped member 42. With this spacing of the jaws, it will be seen that limited rotation of the driven member 30 is possible with respect to the control member constituted by the spaced apart member 41 and 42.

Additional locking means are provided for maintaining the teeth 31 in positive engagement with the driving member 10 or with the stationary member 20. Such locking means include a locking pin 91 slidably mounted in a bore within the driving member 10 which pin extends outside the periphery of the member 41 so as to be adapted to engage a hole 92 in the engaging tooth 31. The pin 91 is spring-biased to the position shown by a cantilever spring 93 secured to the member 10. Similarly, a locking pin 95, spring-biased by a spring 96, is slidably mounted in the stationary member 20 and is adapted to engage the hole 92 in the engaging tooth 31.

In the Fig. 5 embodiment, control means are provided for engaging and disengaging the clutch of this invention. Such control means comprise an electromagnetic coil 100 mounted in an annular housing 101 surrounding magnetic extended portion 102 of actuating cylinder 55a. This extended portion is biased into engaged position (i. e. to the right of Fig. 5) by a coil spring 103 surrounding the driven shaft 17. Pins 104 extend through holes in the actuating cylinder 55a to engage the groove 61 in the actuating ring 50. Energization of the coil 100 from a voltage source (not shown) causes movement of the magnetic extended portion 102 to the left to cause disengagement of the clutch in the manner described in connection with Figs. 1–4. The mounting of the cylinder 55a is substantially the same as cylinder 55 of Fig. 3.

*Operation*

In operation it will be seen as in Fig. 2 that the visible tooth 31 of the driven member 30 is in locking engagement with the corresponding jaw 15 of the driving member 10, thus enabling transmission of torque in a clockwise direction as viewed from the right hand in Fig. 2 from the driving member to the driven member 30 and therefore to the driven shaft 17. In order to disengage the clutch, the actuating lever 56 (or in Fig. 5 the extended portion 102) is moved to the left carrying the actuating ring 50 and the pins 51 out of the slots 66 and into the slots 65 of the stationary member. This action uncouples the control member 40 from the driving member 10 and couples it to the stationary member 20, thus stopping the rotation of the control member 40 even though the driving member 10 continues to rotate. At this stage, the jaws 15 and the teeth 31 are still in engagement so the driven member 30 continues to rotate with the driving member 10. However, the limited rotation of the driven member 30 with respect to the control member 40, made possible by the arcuate slots 80 described hereinbefore, together with the cooperation between the cam surfaces on the now fixed member 41 and the cam surfaces on the rotating driven member 30, causes axial movement of the driven member 30 toward the left hand until the teeth 31 are disengaged from the jaws 15 of the driving member 10 and become engaged with the jaws 24 of the stationary member 20 as shown in Fig. 1.

Thus, a positive stop position is provided for the driven member 30, that is, by the locking engagement between the teeth 31 and the jaws 24 supplemented by the cooperation between the locking pin 95 and the hole 92. When it is desired to re-engage the clutch parts, the actuating lever 56 is moved to the right carrying with it the actuating ring 50 and the pins 51 to uncouple the control member 40 from the stationary member 20 and to again couple the control member 40 to the driving member 10. Again because of the cooperating cam surfaces there is axial movement of the driven member 30 disengaging its teeth 31 from the jaws 24 of the stationary member and causing positive locking engagement of the teeth 31 with the jaws 15 of the driving member 10.

While a particular embodiment of the invention has been illustrated and described, modifications thereof will readily occur to those skilled in the art. It should be understood therefore that the invention is not limited to the particular arrangement disclosed but that the appended claims are intended to cover all modifications which do not depart from the true spirit and scope of the invention.

What is claimed as new and desired to be secured by Letters Patent of the United States is:

1. A positive engage, positive stop clutch comprising a rotatable driving member having an axially extending jaw thereon, a stationary member having a jaw extending axially toward the jaw on the driving member and similar thereto but facing in the opposite direction, a rotatable, axially movable driven member having at least one tooth adapted for alternative engagement with the jaws on the driving member and the stationary member, a rotatable control member concentric with said driven member, coupling means for selectively coupling the control member to the driving member or to the stationary member, and means responsive to selective operation of said coupling means and associated with said control member for causing axial movement of the driven member to bring its tooth into positive locking engagement with the jaw of the driving member or into positive locking engagement with the jaw of the stationary member.

2. A positive engage, positive stop clutch as set forth in claim 1, said last-named means including cam surfaces on axially opposite sides of the driven member and cam surfaces on said control member cooperating with each of the cam surfaces on the driven member.

3. A positive engage, positive stop clutch as set forth in claim 1, said last-named means including cam surfaces on axially opposite sides of the driven member and cam surfaces on said control member cooperating with each of the cam surfaces on the driven member, the cam surfaces on the driven member being axially tapering surfaces adapted for mating with axially tapering surfaces on the control member.

4. A positive engage, positive stop clutch comprising a rotatable driving member having an axially extending jaw thereon, a stationary member having a jaw extending axially toward the jaw on the driving member and similar thereto but facing in the opposite direction, a rotatable, axially movable driven member having a tooth adapted for alternative engagement with the jaws on the driving member and the stationary member, a rotatable control member concentric with said driven member, coupling means for selectively coupling the control member to the driving member or to the stationary member, control means for operating said coupling means, and means responsive to selective operation of said coupling means and associated with said control member for causing axial movement of the driven member to bring its tooth into positive locking engagement with the jaw of the driving member or into positive locking engagement with the jaw of the stationary member.

5. A positive engage, positive stop clutch comprising a rotatable driving member having an axially extending jaw thereon; a stationary member having a jaw extending axially toward the jaw on the driving member and similar thereto but facing in the opposite direction; a rotatable, axially movable driven member having at least one tooth adapted for alternative engagement with the jaws on the driving member and the stationary member, said driven member having axially tapering cam surfaces on axially opposite sides thereof, a rotatable control member concentric with said driven member and having two sets of opposed axially tapering cam surfaces thereon, the cam surfaces on the control member being adapted for mating with the cam surfaces on the driven member, coupling means for selectively coupling the control member to the driving member or to the stationary member, the clutch being so constructed and arranged that upon selective operation of said coupling means, said cam surfaces cooperate to cause axial movement of the driven member to bring its tooth into positive locking engagement with the jaw of the driving member or into positive locking engagement with the jaw of the stationary member.

6. A clutch as set forth in claim 5, said coupling means comprising an arcuate groove formed in the driving member, a similar groove formed in said stationary member, and a pin slidably carried by said control member and adapted for axial movement for engagement with one of said grooves.

References Cited in the file of this patent

UNITED STATES PATENTS

| | | |
|---|---|---|
| 1,366,241 | Burch | Jan. 18, 1921 |
| 1,904,563 | Strout | Apr. 18, 1933 |
| 2,019,638 | Stoller et al. | Nov. 5, 1935 |